United States Patent
Lee et al.

(10) Patent No.: US 9,525,182 B2
(45) Date of Patent: Dec. 20, 2016

(54) FUEL CELL SEPARATOR AND FUEL CELL STACK INCLUDING THE SAME

(71) Applicant: Hyundai Motor Company, Seoul (KR)

(72) Inventors: Sung Ho Lee, Seongnam-si (KR); Sun Bo Shim, Seoul (KR)

(73) Assignee: Hyundai Motor Company, Seoul (KR)

( * ) Notice: Subject to any disclaimer, the term of this patent is extended or adjusted under 35 U.S.C. 154(b) by 236 days.

(21) Appl. No.: 14/267,125

(22) Filed: May 1, 2014

(65) Prior Publication Data

US 2015/0171436 A1 Jun. 18, 2015

(30) Foreign Application Priority Data

Dec. 17, 2013 (KR) ........................ 10-2013-0156967

(51) Int. Cl.
*H01M 8/02* (2016.01)
*H01M 8/24* (2016.01)
*H01M 8/10* (2016.01)

(52) U.S. Cl.
CPC ......... *H01M 8/0267* (2013.01); *H01M 8/0258* (2013.01); *H01M 8/241* (2013.01); *H01M 2008/1095* (2013.01); *Y02E 60/50* (2013.01)

(58) Field of Classification Search
CPC .. H01M 8/0258; H01M 8/026; H01M 8/0263; H01M 8/0265; H01M 8/0267
See application file for complete search history.

(56) References Cited

U.S. PATENT DOCUMENTS

| | | | | |
|---|---|---|---|---|
| 4,324,844 | A | * 4/1982 | Kothmann | F28F 13/08 429/120 |
| 4,649,091 | A | * 3/1987 | McElroy | H01M 8/0228 165/104.33 |
| 4,824,741 | A | 4/1989 | Kunz | |
| 5,521,018 | A | 5/1996 | Wilkinson et al. | |
| 5,906,898 | A | 5/1999 | Pondo | |
| 6,808,834 | B2 | 10/2004 | Koschany | |
| 8,354,203 | B2 | 1/2013 | Finsterwalder et al. | |
| 2005/0031933 | A1* | 2/2005 | Blunk | H01M 8/0206 429/437 |
| 2005/0053810 | A1* | 3/2005 | Kato | H01M 8/0247 429/429 |

(Continued)

FOREIGN PATENT DOCUMENTS

| JP | 63-232271 B2 | 9/1998 |
|---|---|---|
| JP | 2006-210136 A | 8/2006 |

(Continued)

*Primary Examiner* — Carlos Barcena

(74) *Attorney, Agent, or Firm* — Mintz Levin Cohn Ferris Glovsky and Popeo, P.C.; Peter F. Corless

(57) ABSTRACT

A fuel cell is provided that includes a plurality of membrane-electrode assemblies (MEAs) and a first flow channel that supplies fuel to one of the membrane-electrode assemblies in which the first flow channel is formed by a plurality of channel plates between the membrane-electrode assemblies. Additionally, a second flow channel supplies air to another one of the membrane-electrode assemblies, and a cooling channel circulates a cooling medium for cooling the first flow channel and the second flow channel. In particular, the cooling channel is provided therein with a split fin that divides the cooling channel accordingly.

17 Claims, 3 Drawing Sheets

(56) References Cited

U.S. PATENT DOCUMENTS

| | | | |
|---|---|---|---|
| 2005/0100771 A1* | 5/2005 | Vyas | H01M 8/0206 |
| | | | 429/437 |
| 2006/0257704 A1* | 11/2006 | Ogino | H01M 8/04067 |
| | | | 429/411 |
| 2008/0050629 A1* | 2/2008 | Lin | H01M 8/0228 |
| | | | 429/437 |
| 2010/0159303 A1* | 6/2010 | Rock | H01M 8/0232 |
| | | | 429/507 |
| 2011/0011325 A1 | 1/2011 | Johnson, III et al. | |
| 2014/0057194 A1* | 2/2014 | Wilkosz | H01M 8/0254 |
| | | | 429/457 |
| 2015/0079488 A1* | 3/2015 | Iritsuki | H01M 8/2465 |
| | | | 429/434 |

FOREIGN PATENT DOCUMENTS

| | | |
|---|---|---|
| JP | 2009-266729 A | 11/2009 |
| KR | 10-2009-0128974 A | 12/2009 |
| KR | 10-2013-0027245 | 3/2013 |

* cited by examiner

FUEL CELL SEPARATOR AND FUEL CELL STACK INCLUDING THE SAME

CROSS REFERENCE TO RELATED APPLICATION

The present application claims priority of Korean Patent Application Number 10-2013-0156967 filed on Dec. 17, 2013, the entire contents of which is incorporated herein for all purposes by this reference.

BACKGROUND OF THE INVENTION

1. Technical Field

The present invention relates to a fuel cell separator and a fuel cell stack including the same, and, more particularly, to a fuel cell separator which can improve a local cooling effectiveness by improving heat transfer efficiency therein, and a fuel cell stack including the same.

2. Description of the Related Art

A fuel cell system typically includes a fuel cell stack for generating electric energy, a fuel supply unit for supplying fuel (hydrogen) to the fuel cell stack, an air supply unit for supplying air (specifically, oxygen which is an oxidant necessary for electrochemical reactions) to the fuel cell stack, and a heat and water control unit for dissipating the reaction heat emitted from the fuel cell stack to outside of the fuel cell system and controlling the operating temperature of the fuel cell stack accordingly.

In the fuel cell stack of the above-configured fuel cell system, through the electrochemical reaction of hydrogen (fuel) with oxygen in air, electricity is generated, and heat and water, as by-products of the reaction, are discharged. The fuel cell stack is formed by continuously stacking a plurality of unit cells, and each of the unit cells includes membrane-electrode assemblies (MEAs) and separators, each being closely disposed on one side of each of the membrane-electrode assemblies.

Here, each of the unit cells is provided with a gasket between the membrane-electrode assembly and the separator w for maintaining a seal and airtightness therebetween. Further, each of the separators is provided with a plurality of manifolds for supplying or discharging fuel and air to or from the membrane-electrode assembly, discharging water (a by-product of the reaction) and circulating a cooling medium therein s (e.g., water).

FIG. 1 is a schematic view showing the cooling flow pattern of a separator of a conventional fuel cell stack including a plurality of manifolds forming channels therebetween, and FIG. 2 is a schematic view showing the temperature deviation between a cooling water inlet and a cooling water outlet of a separator during the operation of a fuel cell stack. From FIG. 2, it can be ascertained that the temperature of the leftmost side of the separator is lowest, the temperature is gradually increased toward the cooling water outlet, and the temperature of the elliptic region of the separator is highest. That is, during the operation of a fuel cell stack, the temperature deviations occur in both lengthwise and widthwise directions. Such a local temperature increase deteriorates the fuel cell stack, thus requiring a solution to the problem.

It is to be understood that the foregoing description is provided to merely aid the understanding of the present invention, and does not mean that the present invention falls under the purview of the related art which was already known to those skilled in the art.

SUMMARY OF THE INVENTION

Accordingly, the present invention has been devised to solve the above-mentioned problems, and an object of the present invention is to provide a fuel cell separator which can locally improve cooling capabilities using a split fin and a porous conducting material, and a fuel cell stack including the same.

In order to accomplish the above object, the present invention provides a fuel cell, including: a plurality of membrane-electrode assemblies (MEAs); a first flow channel that supplies fuel to one of the membrane-electrode assemblies, the first flow channel being formed by a plurality of channel plates between the membrane-electrode assemblies; a second flow channel that supplies air to another one of the membrane-electrode assemblies; and a cooling channel that circulates a cooling medium for cooling the first flow channel and the second flow channel. In particular, the cooling channel is provided therein with a split fin that divides the cooling channel accordingly.

In the exemplary embodiment of the present invention, the split fin may be made of a porous material that may have higher thermal conductivity than the channel plates. For example, the split fin may be made of a carbon fiber or a metal. Additionally, the split fin may be thinner than the channel plates. As such, when the cooling channel has a polygonal section, the split fin may be connected to at least one vertex of the cooling channel.

Furthermore, the split fins may also divide the inner space of the cooling channel into a plurality of spaces. In above exemplary embodiment, the inner walls of the channel plates surrounding the cooling channel may have unevenness. This unevenness may be formed by scratching, nano-coating, plasma treatment, powder application or shortening.

As far as disposition, the split fin may be provided in the cooling channel in the relatively high-temperature region of the fuel cell separator, based on the temperature distribution of the entire fuel cell separator.

Another aspect of the present invention provides a fuel cell stack including the fuel cell separator.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, fuel cell vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, preferred embodiments of the present invention will be described in detail with reference to the attached drawings.

Figure 3:
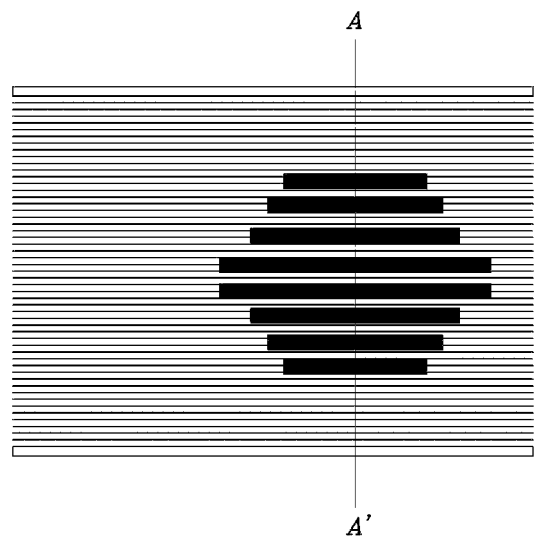
FIG. 3 is a schematic view showing the position of a fuel cell separator having a heat dissipation structure according to an embodiment of the present invention.
Figure 4:
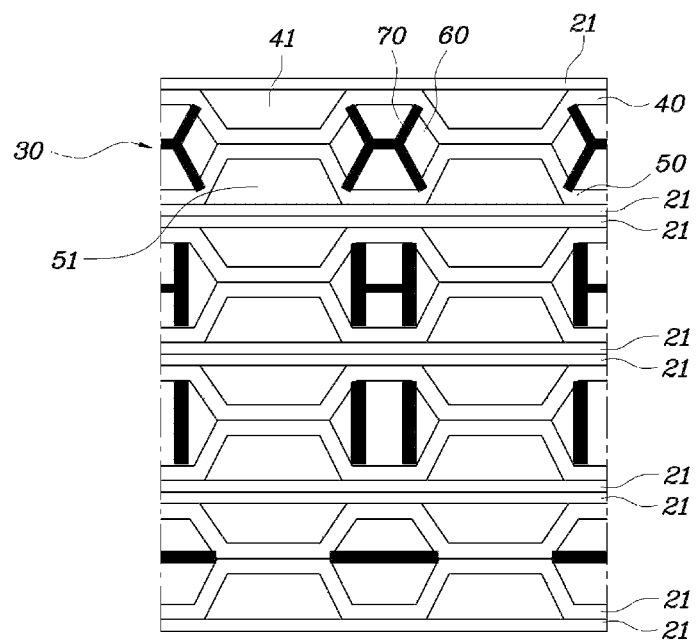
FIG. 4 is an enlarged view of a fuel cell separator having a channel-split heat dissipation structure according to an embodiment of the present invention.
Figure 5:
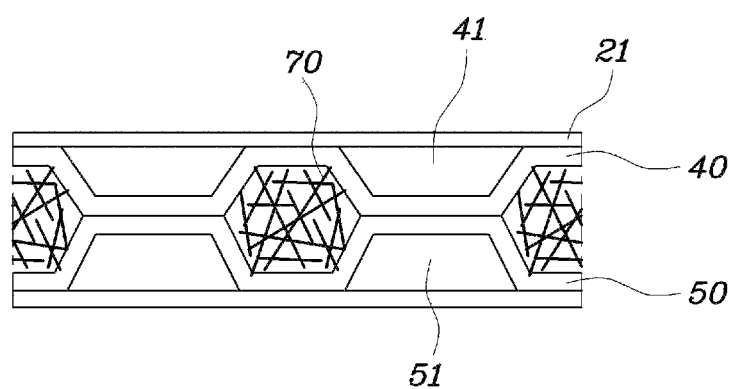
FIG. 5 is an enlarged view of a fuel cell separator having a porous material-filled heat dissipation structure according to another embodiment of the present invention.

FIG. 3 is a schematic view showing the position of a fuel cell separator having a heat dissipation structure according to an exemplary embodiment of the present invention, FIG. 4 is an enlarged view of a fuel cell separator having a channel-split heat dissipation structure according to an exemplary embodiment of the present invention, and FIG. 5 is an enlarged view of a fuel cell separator having a porous material-filled heat dissipation structure according to another exemplary embodiment of the present invention.

Figure 1:
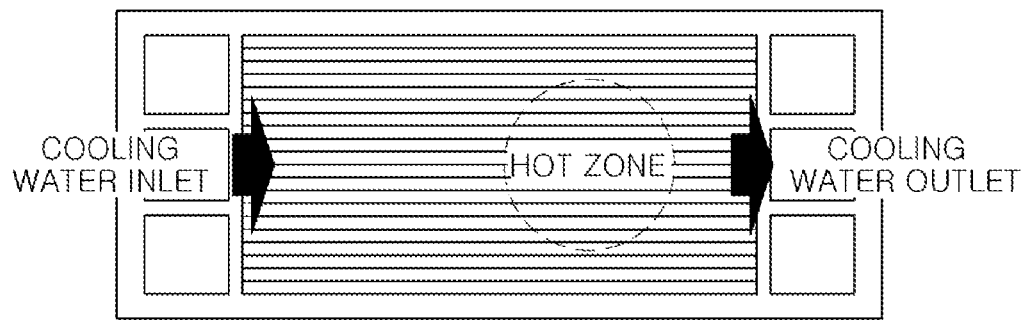
FIG. 1 is a schematic view showing the cooling flow pattern of a unit cell of a typical fuel cell stack.
Figure 2:
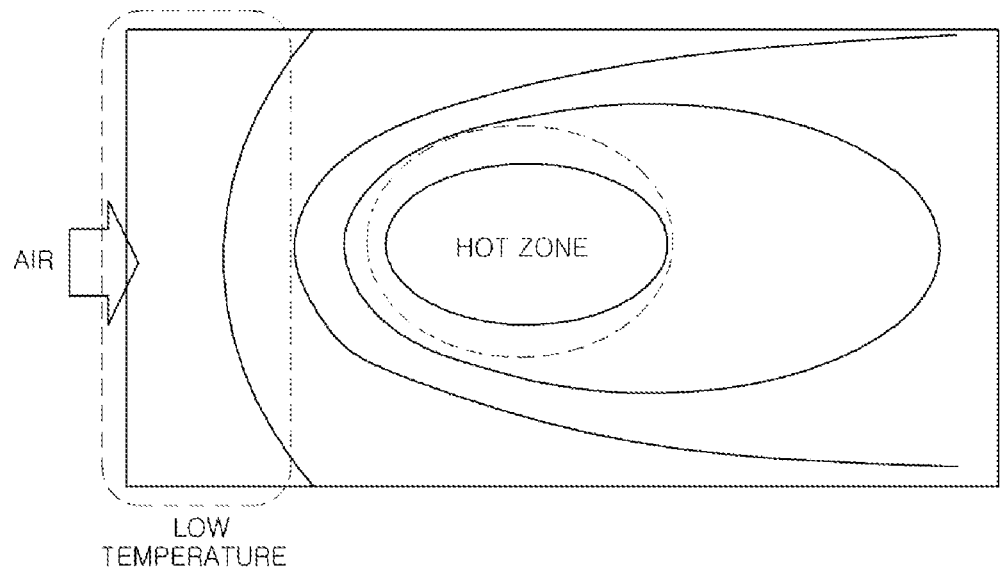
FIG. 2 is a schematic view showing the temperature deviation phenomenon occurring during the operation of a fuel cell stack.

Referring to FIGS. 3 to 5, FIG. 3 is a schematic view showing the position at which the fuel cell separator shown in FIG. 4 or 5 is employed in a unit fuel cell provided with a membrane-electrode assembly (MEA). That is, as shown in FIG. 2, during the operation of a fuel cell stack, a low-temperature region is formed near a cooling water inlet, and a high-temperature region is formed at the center of the unit fuel cell around a cooling water outlet. Therefore, based on the temperature distribution in the unit fuel cell, the fuel cell separator shown in FIG. 4 or 5 is employed in the relatively high-temperature region of the unit fuel cell.

The sectional structure of each of the fuel cell separators shown in FIGS. 4 and 5 will be described. FIG. 4 shows the sectional structures of four fuel cell separators. Each of the sectional structures shown in FIGS. 4 and 5 is taken along the line A-A' in FIG. 3.

A fuel cell stack includes: a plurality of membrane-electrode assemblies (MEA) in which an electrochemical reaction is conducted at both sides of an electrolyte membrane transmitting hydrogen ions; gas diffusion layers (GDL) that uniformly distribute reaction gas and transfer electricity; gaskets for maintaining a seal and airtightness of reaction gas and cooling water; and a separators that form channels for delivering and removing reaction gas and cooling water.

Within the fuel cell stack there are a plurality of unit fuel cells. Each unit fuel cell includes a membrane-electrode assembly (MEA) 21 and a separator 30, and such unit fuel cells are stacked to form a fuel cell stack. Each of the unit fuel cells shown in FIG. 4 may include a membrane-electrode assembly (MEA) 21 and a separator 30 provided with a first channel plate 40, a first flow channel 41, a second channel plate 50, a second flow channel 51, a cooling channel 60 and a split fin 70.

As such, separator 30 disposed between the MEAs 21 is provided with a first flow channel 41 for supplying fuel to a MEA 21, a second flow channel 51 for supplying air to another MEA 21, and a cooling channel 60 for circulating a cooling medium for cooling the first flow channel 41 and the second flow channel 51.

The first channel plate 40 is provided at one side thereof with the first flow channel 41, and the second channel plate 50 is provided at one side thereof with the second flow channel 51. The first flow channel 41 is formed along the length direction of the first channel plate 40, and the second flow channel 51 is formed along the longitudinal (lengthwise) direction of the second channel plate 50. The first channel plate 40 and the second channel plate 50 may be made of a metal thin plate, and, as shown in FIG. 4, may be attached to each other by welding.

The first flow channel 41 and the second flow channel 51 may, for example, have a trapezoidal shape, and the junction parts of the first channel plate 40 and the second channel plate 50 may be an upper side of the first flow channel 41 and a lower side of the second flow channel 51, respectively. Further, the junction part of the first channel plate 40 and the MEA 21 may be a lower side of the first flow channel 41, and a junction part of the second channel plate 50 and the MEA 21 may be a lower side of the second flow channel 51.

The cooling channel 60 may have a polygonal section, and, as shown in FIG. 4, may more specifically, have a hexagonal section. The cooling channel 60 may be adjacent to the first flow channel 41 with the first channel plate 40 placed therebetween, and may be adjacent to the second flow channel 51 with the second channel plate 50 placed therebetween. Therefore, when a cooling medium circulates in the cooling channel 60, the first flow channel and the second flow channel can be cooled accordingly.

The split fin 70 may be made of a porous material, and the thermal conductivity of such a porous material should preferably be higher than that of the first channel plate 40 and the second channel plate 50. Further, the thickness of the split fin may be thinner than that of the first channel plate 40 and the second channel plate 50.

The cooling channel 60 may include a plurality of split fins 70, and, as shown in FIG. 5, the plurality of split fins 70 in the cooling channel 60 may be placed at random. The split fin 70 in the cooling channel 60 divide the inner space of the cooling channel 60 into a plurality of spaces. In particular, when the cooling channel 60 has a polygonal cross section, the split fin is connected to at least one vertex of the cooling channel 60, thus divides the inner space of the cooling channel 60 accordingly.

The split fin 70 may also be provided in order to enlarge a heat dissipation area at a high-temperature region using a fin effect. The split fin 70 can enlarge the heat dissipation area by increasing the contact area of a cooling medium in the cooling channel 60. Therefore, the local cooling efficiency can be increased. The split fin 70 may be made of a carbon fiber or a metal material, and is preferably configured such that it has low thermal inertia because such a material needs only the ability to transfer heat efficiently and also minimize flow resistance. The split fin 70 should also have a large surface area, a small volume and a minimal weight.

As such, the inner walls of the first channel plate 40 and second channel plate 50 constituting the cooling channel 60 may have unevenness. The unevenness formed on the inner walls of the first channel plate 40 and second channel plate 50 may be formed by scratching, nano-coating, plasma treatment, powder application or shortening.

Advantageously, as described above, the fuel cell separator according to the exemplary embodiment of the present invention allows for the temperature deviation in the separator can be adjusted effectively. Further, the fuel cell separator is advantageous in that the relatively high temperature region in the separator can be locally cooled, thus preventing the deterioration of a fuel cell. Additionally, the heat transfer area in contact with a cooling medium can be increased.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A fuel cell separator, comprising:
a first flow channel that supplies fuel to one membrane-electrode assembly, the first flow channel being formed by a plurality of channel plates between membrane-electrode assemblies in a fuel cell stack;
a second flow channel that supplies air to another membrane-electrode assembly in the fuel cell stack; and
a cooling channel configured to circulate a cooling medium to cool the first flow channel and the second flow channel,
wherein the cooling channel is provided therein with a split fin that divides the cooling channel, and
wherein the split fin is made of a porous material, and the porous material has higher thermal conductivity than the channel plates.

2. The fuel cell separator of claim 1, wherein the split fin is thinner than the channel plates.

3. The fuel cell separator of claim 1, wherein, when the cooling channel has a polygonal cross section, and the split fin is connected to at least one vertex of the cooling channel.

4. The fuel cell separator of claim 1, wherein the cooling channel includes a plurality of split fins and the plurality of split fins divide the inner space of the cooling channel into a plurality of spaces.

5. The fuel cell separator of claim 1, wherein the split fin is made of a carbon fiber or a metal.

6. The fuel cell separator of claim 1, wherein inner walls of the channel plates surrounding the cooling channel are uneven.

7. The fuel cell separator of claim 6, wherein the inner walls are scratched, nano-coated, plasma treated, have powder applied thereon or shortened.

8. The fuel cell separator of claim 1, wherein the split fin is provided in the cooling channel in the relatively high-temperature region of the fuel cell separator, based on a temperature distribution of an entire separator.

9. A fuel cell, comprising:
a plurality of membrane-electrode assemblies (MEAs); and
at least one separator including:
a first flow channel that supplies fuel to one of the membrane-electrode assemblies, the first flow channel being formed by a plurality of channel plates between the membrane-electrode assemblies;
a second flow channel that supplies air to another one of the membrane-electrode assemblies; and
a cooling channel configured to circulate a cooling medium to cool the first flow channel and the second flow channel,
wherein the cooling channel is provided therein with a split fin that divides the cooling channel, and
wherein the split fin is made of a porous material, and the porous material has higher thermal conductivity than the channel plates.

10. The fuel cell of claim 9, wherein the split fin is thinner than the channel plates.

11. The fuel cell of claim 9, wherein, when the cooling channel has a polygonal cross section and the split fin is connected to at least one vertex of the cooling channel.

12. The fuel cell of claim 9, wherein the cooling channel includes a plurality of split fins and the plurality of split fins divide the inner space of the cooling channel into a plurality of spaces.

13. The fuel cell of claim 9, wherein the split fin is made of a carbon fiber or a metal.

14. The fuel cell of claim 9, wherein inner walls of the channel plates surrounding the cooling channel are uneven.

15. The fuel cell of claim 14, wherein the inner walls are scratched, nano-coated, plasma treated, have powder applied thereon or shortened.

16. The fuel cell of claim 9, wherein the split fin is provided in the cooling channel in the relatively high-temperature region of the fuel cell separator, based on a temperature distribution of an entire separator.

17. A fuel cell stack, comprising the fuel cell of claim 9.

* * * * *